United States Patent
Baudou et al.

(10) Patent No.: US 12,185,785 B2
(45) Date of Patent: Jan. 7, 2025

(54) METHOD FOR FITTING A HELMET TO THE HEAD OF A USER

(71) Applicant: THALES, Courbevoie (FR)

(72) Inventors: Joël Baudou, Saint Médard en Jalles (FR); Philippe Dumercq, Mérignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 18/129,752

(22) Filed: Mar. 31, 2023

(65) Prior Publication Data
US 2023/0320449 A1 Oct. 12, 2023

(30) Foreign Application Priority Data
Apr. 7, 2022 (FR) .................................. 2203179

(51) Int. Cl.
*A42C 2/00* (2006.01)
*A42B 3/10* (2006.01)
*B33Y 80/00* (2015.01)

(52) U.S. Cl.
CPC .............. *A42B 3/10* (2013.01); *A42C 2/007* (2013.01); *B33Y 80/00* (2014.12)

(58) Field of Classification Search
CPC ......... A42C 2/007; A42B 3/125; A42B 3/127; A42B 3/128; A42B 3/12; A42B 3/10;
(Continued)

(56) References Cited

U.S. PATENT DOCUMENTS

| | | | | |
|---|---|---|---|---|
| 5,866,826 A | * | 2/1999 | Bataille | G02B 27/0176 |
| | | | | 73/865.6 |
| 5,891,372 A | * | 4/1999 | Besset | A42C 2/007 |
| | | | | 264/222 |

(Continued)

FOREIGN PATENT DOCUMENTS

| | | | | |
|---|---|---|---|---|
| FR | 2 750 578 A1 | | 1/1998 | |
| FR | 3054413 A1 | * | 2/2018 | ............. A42B 3/128 |

(Continued)

OTHER PUBLICATIONS

English translation of FR 3054413 (Donnadieu) Doc pub Feb. 2018. (Year: 2018).*

*Primary Examiner* — Amy Vanatta
(74) *Attorney, Agent, or Firm* — BakerHostetler (57) ABSTRACT

A method for fitting a pre-existing standard helmet to the head of a user, the helmet includes an optronic device intended to be positioned in front of the eyes of the user, the method comprising: A) measuring the dimensions of the user's head, the dimensions of the head comprising a volume of the head and a position of the eyes, B) obtaining the dimensions of the helmet, the dimensions of the helmet including a volume of the helmet, C) defining a lining for the helmet so as to ensure the positioning of the optronic device in front of the user's eyes, the lining having a top face that is intended to be applied against an inner face of the helmet and a bottom face that is intended to be applied against the user's head, the lining having a flexible cellular structure, the manufacture of the lining being adapted to the dimensions of the head and to the dimensions of the helmet, D) manufacturing the lining as defined in step C), and E) placing the lining inside the helmet.

13 Claims, 4 Drawing Sheets

(58) Field of Classification Search
CPC ........... A42B 3/124; A42B 3/06; A42B 3/063;
A42B 3/062; B33Y 80/00
See application file for complete search history.

(56) References Cited

U.S. PATENT DOCUMENTS

| | | | |
|---|---|---|---|
| 9,545,127 B1* | 1/2017 | Sandifer | A42B 3/121 |
| 10,159,296 B2* | 12/2018 | Pietrzak | G05B 19/4099 |
| 10,235,801 B2* | 3/2019 | Ebisawa | A42B 3/125 |
| 10,780,338 B1* | 9/2020 | Bologna | A42C 2/002 |
| 2004/0163228 A1 | 8/2004 | Piorkowski et al. | |
| 2009/0265840 A1* | 10/2009 | Favre-Felix | A42C 2/007 |
| | | | 264/319 |
| 2018/0027914 A1 | 2/2018 | Cook | |
| 2018/0271202 A1* | 9/2018 | Wiart | A63B 71/10 |
| 2020/0205503 A1* | 7/2020 | Vanhoutin | A42B 3/127 |
| 2021/0001560 A1 | 1/2021 | Cook et al. | |
| 2023/0354944 A1* | 11/2023 | Petre | A42B 3/127 |
| 2024/0143867 A1* | 5/2024 | Desrochers | A42B 3/065 |

FOREIGN PATENT DOCUMENTS

| | | | | |
|---|---|---|---|---|
| GB | 2 398 476 A | | 8/2004 | |
| GB | 2417881 A | * | 3/2006 | A42B 3/124 |

* cited by examiner

METHOD FOR FITTING A HELMET TO THE HEAD OF A USER

CROSS-REFERENCE TO RELATED APPLICATION

This application claims priority to foreign French patent application No. FR 2203179, filed on Apr. 7, 2022, the disclosure of which is incorporated by reference in its entirety.

FIELD OF THE INVENTION

The technical domain of the present invention relates to the domain of inner linings for helmets, and in particular to a method for defining and manufacturing an inner lining for a helmet.

BACKGROUND

Optronic devices mounted on helmets in front of the eyes of a user, such as a pilot, are usually positioned using an inner lining comprising foam shims. The inner lining can be inserted into a standard-size helmet to compensate for the space between the user's head and the protective helmet and to adjust the position of the optronic device in front of the user's eyes. However, this type of lining does not allow precise adjustment of the position of the optronic device, and requires readjustment after a few hours of use. Furthermore, a poor fit can cause pain due to localized pressure.

Alternatively, it is possible to manufacture a customized helmet including the optronic device, in which the helmet is adapted to the shape and size of the user's head. Customized helmets are usually made by moulding or machining. However, manufacturing a customized helmet is expensive, requires several hours of work and generates a significant amount of waste.

SUMMARY

In order to overcome the drawbacks associated with the existing solutions, the invention proposes a customized lining that is adapted to the head of a user and to the dimensions of a pre-existing standard helmet. Specifically, the invention relates to a method for fitting a pre-existing standard helmet to the head of a user, the helmet comprising an optronic device intended to be positioned in front of the eyes of the user. The fitting method allows the manufacture of a helmet lining that improves the comfort and the precision of the position of the optronic device in front of the user's eyes.

Moreover, certain aspects of the invention described below, such as the manufacture of a flat lining, the manufacture of a lining comprising different portions, and the flexibility of the portions, facilitate manufacture, reduce manufacturing time, and reduce the amount of waste associated with manufacture.

The invention is intended to improve the situation by proposing a method for fitting a pre-existing standard helmet to the head of a user, the helmet comprising an optronic device intended to be positioned in front of the eyes of the user, the method comprising:
  A) measuring the dimensions of the user's head,
  B) obtaining the dimensions of the helmet,
  C) defining a lining for the helmet so as to ensure the positioning of the optronic device in front of the user's eyes, the lining having a top face that is intended to be applied against an inner face of the helmet and a bottom face that is intended to be applied against the user's head, the lining having a flexible cellular structure, the manufacture of the lining being adapted to the dimensions of the head and to the dimensions of the helmet,
  D) manufacturing the lining as defined in step C), and
  E) placing the lining inside the helmet.

In one embodiment, the lining is defined to include a plurality of portions corresponding to zones of the user's head.

In one embodiment, the lining is designed such that portions of the plurality of portions are connected by one or more flexible links.

In one embodiment, the manufacturing in step D) comprises manufacturing each portion flat.

In one embodiment, the portions comprise at least a portion at the user's nape and a portion corresponding to the top of the user's head, the portion corresponding to the zone of the user's nape having a cellular structure with a lower density than the portion corresponding to the zone of the top of the user's head, the density representing the number of cells per unit area of the flattened lining.

In one embodiment, the cellular structure comprises through-cells extending from the top face to the bottom face.

In one embodiment, the cellular structure has a lattice pattern.

In one embodiment, a first zone of the cellular structure and a second zone are defined, the first zone having a first pattern and the second zone having a second pattern.

In one embodiment, the cellular structure has a non-uniform density, the density representing the number of cells per unit area of the flattened lining.

In one embodiment, the lining comprises several portions corresponding to zones of the user's head, the portion corresponding to the zone of the user's nape having a cellular structure with a lower density than the portion corresponding to the zone of the top of the user's head.

In one embodiment, the lining comprises a first portion having a first thickness and a second portion having a second thickness.

In one embodiment, the lining is manufactured by additive manufacturing.

In one embodiment, the method also comprises measuring the dimensions of the equipment placed inside the helmet and, during step C), adapting the lining to the dimensions of the equipment.

In one embodiment, the measurement of the dimensions of the user's head is a dimension of one or more zones of the head.

Another aspect of the present invention relates to a lining obtained using the method obtained by the embodiments described hereinabove.

BRIEF DESCRIPTION OF THE DRAWINGS

The invention and additional advantages thereof can be better understood from reading the non-limiting description given below, with reference to the figures, in which.

DETAILED DESCRIPTION

Figure 1:
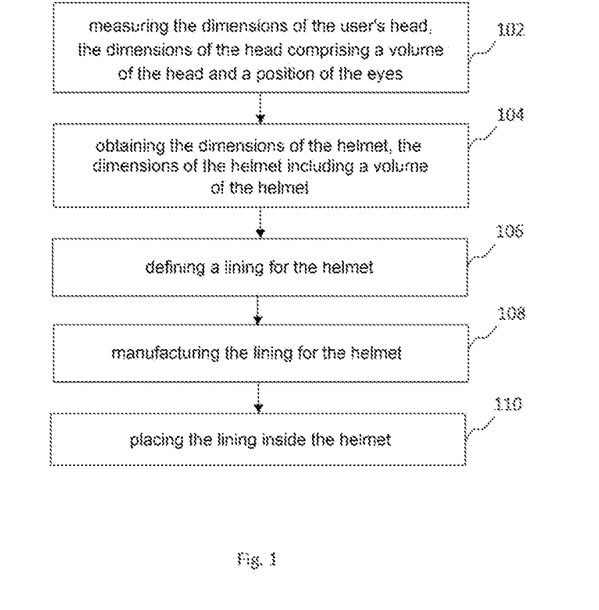
FIG. 1 shows an example method for fitting a helmet to the head of a user.
Figure 2A:
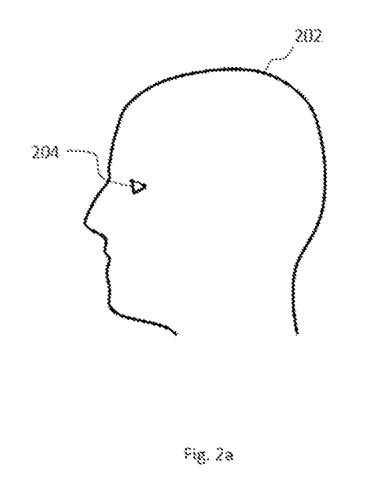
FIG. 2a shows a user's head.
Figure 2B:
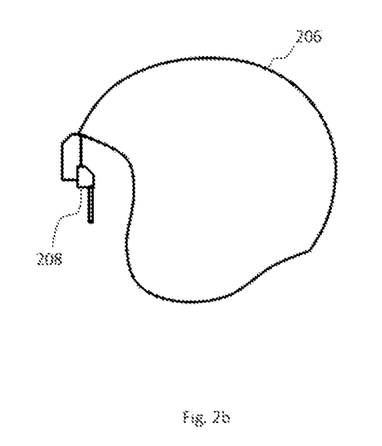
FIG. 2b shows an example of a helmet with an optronic device.

FIG. 1 illustrates an example of a method 100 for fitting a pre-existing standard helmet 206 to a user's head 202. As illustrated in FIG. 2a and FIG. 2b, the helmet 206 includes an optronic device 208 that is intended to be placed over the user's eyes 204 when the helmet is worn by the user. The optronic device 208 may for example be a helmet-mounted display. The standard helmet is defined according to a norm or standard suitable for a large number of users. For example, the helmet 206 may be a helmet of standard size (for example S, M, or L) on which the optronic device 208 is pre-mounted. In one example, the position of the optronic device 208 may be adjustable. The position can be approximately adjusted by placing the helmet on the user's head so that the device 208 is positioned in front of the user's eyes 204.

In step 102, the method 100 involves measuring the dimensions of the user's head. For example, the dimensions of the head may include a volume of the head 202 represented by spatial coordinates of the surface of the head and a position of the eyes 204. For example, a 3D scan of the user's head 202 can be performed using a 3D scanner. The scan can for example indicate the position of the pupils when the eye is exposed to different light intensities. Furthermore, the 3D scan can indicate dimensions such as the surface area of different zones of the head 202, for example temples, forehead, nape, top of the head, etc.

In step 104, the method 100 comprises obtaining dimensions of the helmet 206. For example, the dimensions of the helmet can be obtained after the helmet 206 has been designed (by computer-aided design), or measured after manufacturing (by reverse engineering), or obtained from a user manual of the standard helmet. In another example, a 3D scan of the helmet can be carried out to determine the dimensions thereof. The dimensions of the helmet 206 may for example include a volume of the helmet 206 represented by spatial coordinates of the inner face 310 of the helmet 206. The shape of an inner face 310 of the helmet 206 may be determined. For example, the thickness of the helmet 206 may be uniform or may include zones of different thicknesses. In one example, the dimensions of the optronic device 208 may be measured, such as the length or width of the device 208, or the position of a portion of the device 208 intended to be placed on the eye 204.

In step 106, the method 100 comprises defining a lining 300 for the helmet 206 so as to ensure the positioning of the optronic device in front of the user's eyes, the lining 300 having a top face 308a that is intended to be applied against the inner face 310 of the helmet 206 and a bottom face 308b that is intended to be applied against the user's head 202, the lining 300 having a flexible cellular structure, the manufacture of the lining 300 being adapted to the dimensions of the head 202 and to the dimensions of the helmet 206. In particular, the dimensions of the head 202 and of the helmet 206 measured in steps 102 and 104 are used to define the lining 300 so that the optronic device 208 is placed precisely in front of the user's eyes 204.

The lining 300 can be defined using three-dimensional modelling software taking into account the head dimensions measured in step 102 and the helmet dimensions obtained in step 104.

Figure 3A:
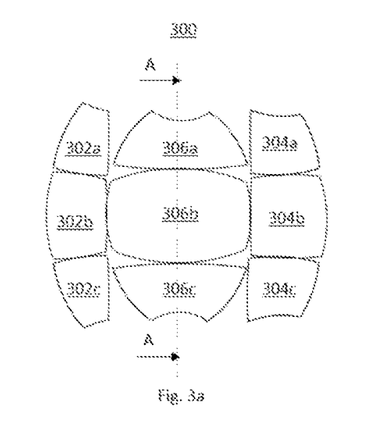
FIG. 3a shows an example of a helmet lining seen from above.
Figure 3B:
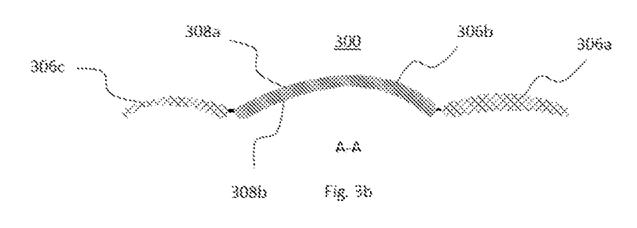
FIG. 3b shows a lateral cross section of an example helmet lining, taken along line A-A.

The lining 300 may be defined to comprise several portions. For example, as illustrated in FIGS. 3a and 3b showing examples of a lining 300 for a helmet 206 as viewed from the front and the top, the lining 300 may comprise several portions 302a-306c corresponding to zones of the user's head 202. In the example shown in FIG. 3a, the lining 300 comprises nine portions 302a-306c. For example, the portions 302a, 302c may correspond to the user's temples, the portion 302b may correspond to the user's forehead, the portion 304b may correspond to the user's nape, the portion 306b may correspond to the top of the head 202, and the portions 304a, 304c, 306a, 306c may correspond to different side portions of the head 202. The zones of the head may be defined by spatial coordinates of the surface area of the user's head that are for example obtained by a 3D scan of the head in step 102. In another example, as shown in FIG. 3c, the lining may comprise five portions 302b, 306a, 306b, 306c, 304b corresponding to the user's forehead, nape, top of the head, and temples.

The lining 300 may be defined to include several portions, in which some portions are connected by one or more flexible links. As illustrated in FIG. 3b, the portions 302a-306c of the lining 300 may be connected by links 320 to connect several portions. The links 320 may for example connect the portion 306a with the portion 306b, the portion 306b with the portion 306c, the portion 302a with the portion 302b, the portion 302b with the portion 302c, the portion 304a with the portion 304b, the portion 304b with the portion 304c, the portion 302b with the portion 306b, and the portion 306b with the portion 304b. In another example, several links 320 may connect two portions.

Figure 3C:
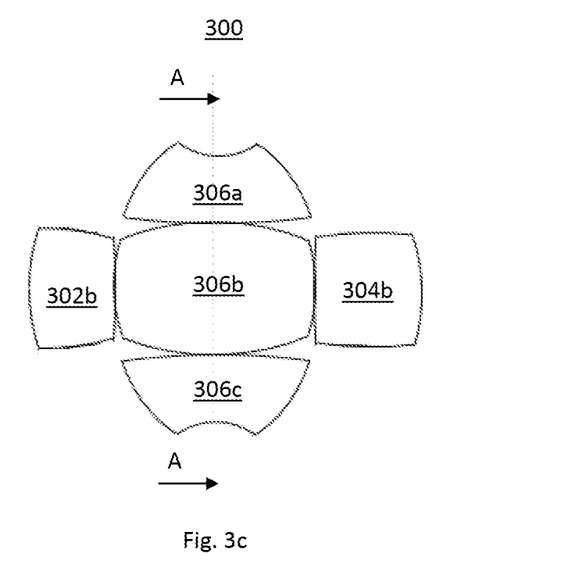
FIG. 3c shows another example of a helmet lining seen from above.

As illustrated in FIGS. 3a-3d, the lining 300 comprises different separate portions 302a-306c. These portions are advantageous because they enable the lining to be manufactured flat. Indeed, in these examples, the portions 302a-306c are defined so as to be detached from each other, thereby obtaining a flat lining that can then be placed in the helmet 206, adopting the shape of the inner face 310 of the helmet 206. In particular, the lining 300 may be manufactured flat, as shown in FIG. 3c (see details below). The top face 308a is designed to be in contact with the inner face 310 of the helmet 206 and can therefore be flat during manufacture. The flexibility of the lining 300 (generated by the flexible cellular structure and the flexible links 320) and the various portions 302a-306c then enable the lining 300 to be inserted into the helmet 206, with the shape of the lining 300 adapting to the shape of the inner face 310 of the helmet 206. In one example, each portion 302a-306c can be manufactured separately, and then the portions 302a-306c can be assembled to form the lining 300. For example, the detached portions 302a-306c may be defined such that cells in the cellular structure allow the portions 302a-306c to be assembled by interlocking to form the lining 300. The manufacture of detached portions 302a-306c allows the portions 302a-306c to be printed separately, thereby facilitating the manufacture thereof (by 3D printing, for example). Advantageously, it is possible to use small manufacturing means, which may be transportable and less expensive than the means required to manufacture a complete lining. In another example, the portions can be defined to be partially detached from each other.

In another example, the portions 302a-306c may be defined such that the lining 300 is manufactured directly with the shape of the inner face 310 of the helmet 206. For example, the portions 302a-306c may be defined with a shape matching the inner face 310 of the helmet 206.

In order to adjust the position of the optronic device 208 so that said optronic device is positioned in front of the user's eyes 202, the thickness of the different portions 302a-306c can be varied. For example, the thickness of the portion 306b corresponding to the top of the head 202 may be greater than the thickness of the portion 306a to adjust the position of the device 208. In addition to enabling the optronic device 208 to be precisely adjusted in front of the eyes 204, varying the thickness of the different portions 302a-306c also allows the user to make adjustments for comfort, particularly where the helmet 206 is of standard size. For example, the portions 302a, 302c corresponding to the user's temples may be thicker than the portion 306b corresponding to the top of the head 202 to improve the comfort of the helmet 206. For example, the thickness of the different portions 302a-306c may be between 1 mm and 20 mm. In another example, as shown in FIG. 3b, a given portion 302a-306c may have different thicknesses. For example, each of the portions 306a, 306b may have different thicknesses. For example, the thickness may vary gradually within a single portion 302a-306c.

In one example, the cellular structure can have a non-uniform density, the density representing the number of cells per unit area of the flattened lining. For example, the portion corresponding to the zone of the user's nape may have a cellular structure with a higher density than the portion corresponding to the zone of the top of the user's head. For example, all or some of the portions 302a-306c of the lining 300 shown in FIG. 3a may have different cell densities. In another example, the density of the cells in the lining 300 can be adapted to different zones of the head. For example, a portion of the lining 300 corresponding to the zone of the user's nape may have a cellular structure with a higher density than the portion corresponding to the zone of the top of the user's head. Thus, the flexibility of the lining can be varied by varying the density of the cells. The lower the density, the more flexible the lining 300 will be. Decreasing the density for example at the nape therefore enables the user to move his head 202 more easily (head movements cause a change in the volume of the neck, while speaking or chewing causes a change in the shape of the temples and/or the jaw). In particular, the flexibility of the lining 300 may be provided by the vertical walls of the cells, for example enabling the lining 300 to be manufactured flat and then inserted into the helmet 206. Furthermore, the lining may be vertically flexible, i.e. the lining may be compressed between the top face 308a and the bottom face 308b. For example, superposing several layers of cells can facilitate vertical flexibility. This enables the user to move his head 202 more easily, and to insert his head 202 into the helmet 206 more easily. In another example, the same portion 302a-306c may have a variable cell density. For example, the density may change gradually within the same portion 302a-306c.

In one example, the method 100 can also comprise measuring the dimensions of the equipment placed inside the helmet 206 and, during step 106, adapting the definition of the lining to the dimensions of the equipment. For example, in step 102, the user can wear equipment such as a fireproof hood, a comfort fabric (for example a foam lining placed between the user's head and the lining 300 to improve comfort when wearing the helmet), a mask, goggles, etc. The dimensions of the user's head can thus be measured using a 3D scan of the head and the equipment, indicating for example the volume of the head and the equipment. In another example, equipment may be placed in the helmet during step 104. For example, a headset or a microphone can be built into the helmet, and the dimensions of the helmet can take into account the dimensions of the equipment.

Figure 4A:
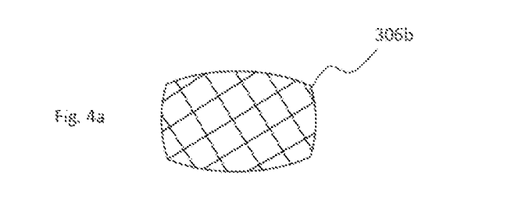
FIG. 4a shows an example of a cellular structure.
Figure 4B:
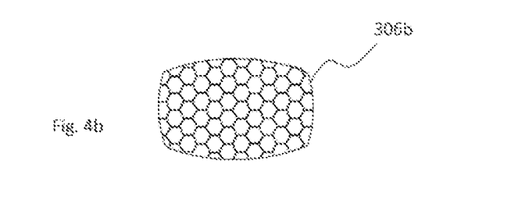
FIG. 4b shows another example of a cellular structure.
Figure 5:
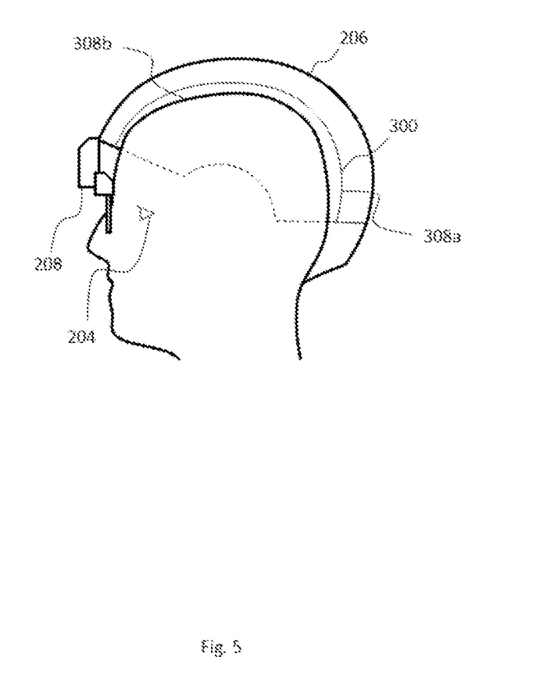
FIG. 5 shows an example of a helmet with a lining.

As shown in FIGS. 4a and 4b illustrating two portions of the lining 300, the cellular structure defined in step 106 includes cells forming a pattern. For example, the pattern of the cellular structure may be a lattice pattern (such as a grille). In the example shown in FIG. 4a, a uniform rectangular pattern is used (comprising rectangular cells). In the example shown in FIG. 4b, a uniform honeycomb pattern is used (comprising honeycomb-shaped cells). In another example, a V-shaped or circular pattern may be used. In another example, a non-uniform pattern can be used, i.e. comprising cells of different sizes and/or shapes. In one example, a pattern comprising rectangular cells and honeycomb cells may be used, for example. In one example, during step 106, the cellular structure may comprise through-cells extending from the top face 308a to the bottom face 308b. For example, as shown in FIG. 3c, the rectangular cells in the portion 306b and the parallelepipedic cells may be through-cells extending from the top face 308a to the bottom face 308b. The through-cells allow for a flexible lining 300 that can be easily inserted and removed from the helmet 206, allowing the user to move his or her head 202 and allowing the skin to breathe. In another example, as shown in FIGS. 3b and 3c showing the lining 300 from the side, several layers of cells may be arranged on top of each other.

In one example, during step 106, a first zone and a second zone of the cellular structure may be defined, the first zone having a first pattern and the second zone having a second pattern. For example, the first zone and the second zone may correspond to a separate portion 302a-306c of the lining 300 as shown in FIG. 3a. Each portion 302a-306c can have a different pattern (different pattern and/or different size cells). Alternatively, some portions 302a-306c may also have the same pattern while other portions 302a-306c may have a different pattern. In another example, the first zone and the second zone may correspond to zones of the head such as the nape, the temples or the top of the head. Each zone of the lining 300 corresponding to a zone of the head can have a different pattern (different pattern and/or different size cells). Alternatively, some zones of the lining 300 corresponding to a zone of the head can also have the same pattern while other zones may have a different pattern. For example, the portion 302a may have a honeycomb pattern and the portion 302b may have a circular pattern. As shown in FIG. 3c, the portion 306b may have a rectangular pattern and the portions 306a, 306c may have a parallelepipedic pattern. In another example, a given portion 302a-306c may have several zones, each zone comprising different cells. In another example, the different patterns may be the same pattern (for example honeycomb) with different sizes. For example, the size of the pattern may change gradually within the same portion 302a-306c. Adapting the pattern therefore allows the flexibility of the lining 300 and user comfort to be adjusted. Indeed, different patterns allow for different flexibilities that can, for example, facilitate movement of the head (for example, about the user's nape).

Figure 3D:
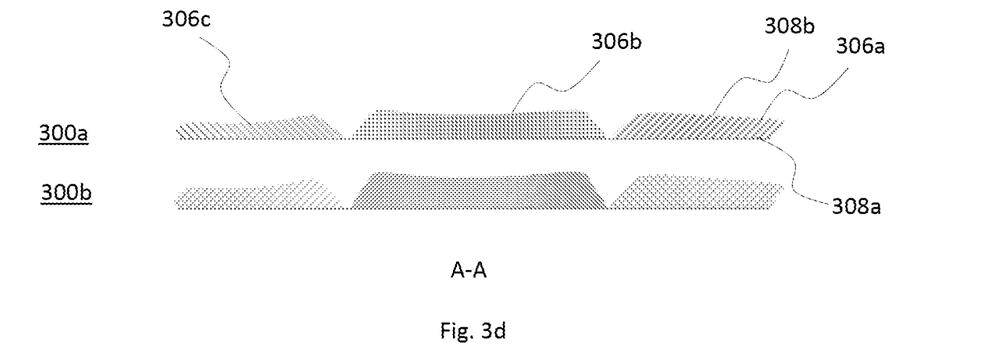
FIG. 3d is a lateral cross section of two more example helmet linings, taken along line A-A.

In step 108, the method 100 comprises manufacturing the lining 300 as defined in step 106. As mentioned above, in one example, the lining 300 can be manufactured flat by defining several flat portions 302a-306c. The lining 300 may be manufactured by additive manufacturing, such as by stereo lithography of material in liquid state, powder sintering, and fusion of solid-wire material (for example using three-dimensional (3D) printing). The lining 300 can be made of elastomeric material. For example, the lining 300 can be made of nylon, polyurethane or polystyrene. In one example, different portions of the lining 300 may be made of different materials. In particular, materials of different flexibility may be used, helping to improve user comfort and allowing the user to easily move his head covered by the helmet 206 containing the lining 300. In one example, the lining 300 may be manufactured flat by additive manufacturing. As noted above, the lining 300 may comprise several portions 302a-306b. The portions 302a-306b enable the lining 300 to be manufactured flat. Indeed, each portion can be manufactured by flat 3D printing, as illustrated in FIG. 3d. Each portion can be made of a flexible material. The flexibility of the material of the lining 300 and the different portions 302a-306c then enable the lining to be inserted into the helmet and to easily adapt to the shape of the inner face 310 of the helmet. Manufacturing the portions 302a-306c flat therefore simplifies manufacturing and reduces manufacturing time. Indeed, there is no need for an additional step such as the manufacture of a 3D-printing substrate in the shape of the helmet, which would have to be removed afterwards once the helmet has been made. This also reduces the waste generated by the manufacturing process since there is no additional material to remove. Moreover, flat manufacturing allows the lining 300 to be manufactured directly on a substrate of the printer, without requiring a manufacturing substrate having the shape of the desired lining (for example, a substrate having the shape of the inner face 310 of the helmet 206). For example, in the case of the lining in FIG. 3d, the portion 306b corresponding to the top of the head may be first manufactured flat by 3D printing on the substrate of the printer. The links 320 can be manufactured by 3D printing, allowing the portion 306b to be connected to the other portions 302b, 306a, 304b, 306b. These links can be flexible links. The links can be made of a flexible material suitable for 3D manufacturing, such as a polymer (for example nylon, polyurethane or polystyrene). The lining 300 and the links 320 can be made of the same material or a different material. Each portion is then manufactured flat by 3D printing about the portion 306b, with the portion 306b remaining stationary during manufacture. All of the portions of the lining 300 can therefore be manufactured flat.

In another example, as shown in FIG. 3b, the lining 300 may be printed on a substrate having the shape of the inner face 310 of the helmet 206. For example, a substrate can be obtained in advance for each helmet of standard size (for example S, M, or L) and the lining can be manufactured on the substrate corresponding to the helmet into which the lining 300 will be inserted. For example, the substrate can be obtained by moulding the standard helmet. This ensures that the lining 300, once inside the helmet 206, fits the shape of the inner face 310 of the standard helmet 206 used.

These manufacturing methods reduce material waste compared to the machining or moulding typically used in the manufacture of customized helmets. Furthermore, these methods allow a helmet adapted to fit a user's head to be made quickly from an existing helmet.

In step 110, the method 100 includes placing the lining inside the helmet 206. The user can then wear the helmet with the optronic device 208 precisely adjusted to his eyes as a result of the lining placed inside the helmet 206.

The invention described above both provides accurate positioning of the optronic device 208 on the user's eyes, and therefore a helmet 206 that is stationary when worn, and provides comfort when wearing the helmet, even for an extended period of time. Thus, the method 100 described above achieves a balance between flexibility and rigidity of the lining 300, allowing for precise positioning and comfort. Furthermore, the portions and the flat manufacturing of the portions help to simplify manufacturing, to reduce manufacturing time, and to reduce manufacturing waste.

Although the invention has been illustrated and described in detail using a preferred embodiment, the invention is not limited to the examples disclosed. Other variants may be deduced by the person skilled in the art without thereby moving outside the scope of protection of the claimed invention. For example, although FIGS. 4a and 4b illustrate honeycomb or rectangular cells in a uniform pattern, a person skilled in the art will understand that there are many patterns available to vary the properties of the lining, for example flexibility and comfort. Furthermore, the person skilled in the art will understand that the thickness, cell density, and pattern can be simultaneously adapted to position the optronic device in front of the user's eyes, as well as to improve comfort and head movement. Moreover, FIGS. 3a-3d illustrate examples of portions of the lining. However, the person skilled in the art will understand that there are other examples comprising different numbers, shapes and designs of portions that can be used to fit a helmet to a user's head.

The invention claimed is:

1. A method for fitting a pre-existing standard helmet to the head of a user, the helmet comprising an optronic device intended to be positioned in front of the eyes of the user, the method comprising:
   A) measuring the dimensions of the user's head,
   B) obtaining the dimensions of the helmet,
   C) defining a lining for the helmet so as to ensure the positioning of the optronic device in front of the user's eyes, the lining having a top face that is intended to be applied against an inner face of the helmet and a bottom face that is intended to be applied against the user's head, the lining having a flexible cellular structure, the manufacture of the lining, including a thickness and/or a density of the flexible cellular structure, being adapted to the dimensions of the head and to the dimensions of the helmet,
   D) manufacturing the lining as defined in step C), and
   E) placing the lining inside the helmet.

2. The fitting method according to claim 1, wherein the lining is defined to include a plurality of portions corresponding to zones of the user's head.

3. The fitting method according to claim 2, wherein the lining is designed such that portions of the plurality of portions are connected by one or more flexible links.

4. The fitting method according to claim 2, wherein the manufacturing in step D) comprises manufacturing each portion flat.

5. The fitting method according to claim 1, wherein the lining is flattened and the cellular structure has a non-uniform density, the non-uniform density representing the number of cells per unit area of the flattened lining.

6. The fitting method according to claim 2, wherein the lining is flattened and the portions comprise at least a portion corresponding to the user's nape and a portion corresponding to the top of the user's head, the portion corresponding to the zone of the user's nape having a cellular structure with a lower density than the portion corresponding to the zone of the top of the user's head, the lower density representing the number of cells per unit area of the flattened lining.

7. The fitting method according to claim 1, wherein the lining is manufactured by additive manufacturing.

8. The fitting method according to claim 1, wherein the lining comprises a first portion having a first thickness and a second portion having a second thickness.

9. The fitting method according to claim 1, wherein during step C), the cellular structure comprises through-cells extending from the top face to the bottom face.

10. The fitting method according to claim 1, wherein during step C), the cellular structure has a lattice pattern.

11. The fitting method according to claim 1, wherein during step C), a first zone of the cellular structure and a second zone are defined, the first zone having a first pattern and the second zone having a second pattern.

12. The fitting method according to claim 1, wherein the method also comprises measuring the dimensions of equipment placed inside the helmet and, during step C), adapting the definition of the lining to the dimensions of the equipment.

13. The fitting method according to claim 1, wherein the measurement of the dimensions of the user's head is a dimension of one or more zones of the head.

* * * * *